May 29, 1962  A. MOTTU ET AL  3,036,493
OPTICAL POSITIONING SYSTEM
Filed Jan. 27, 1959  3 Sheets-Sheet 2

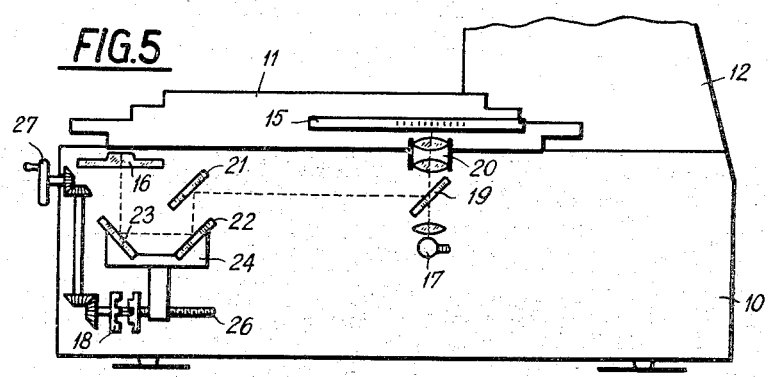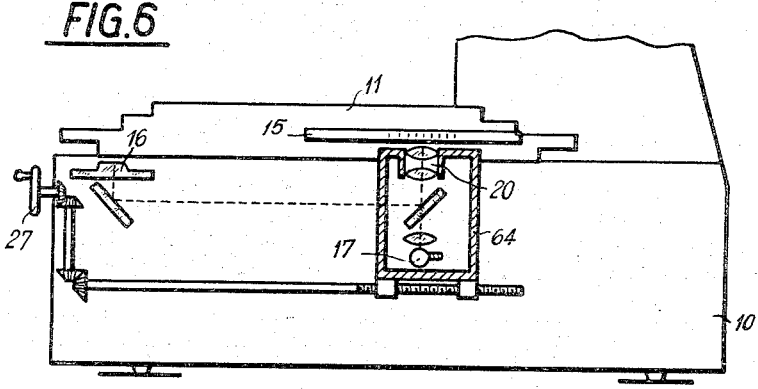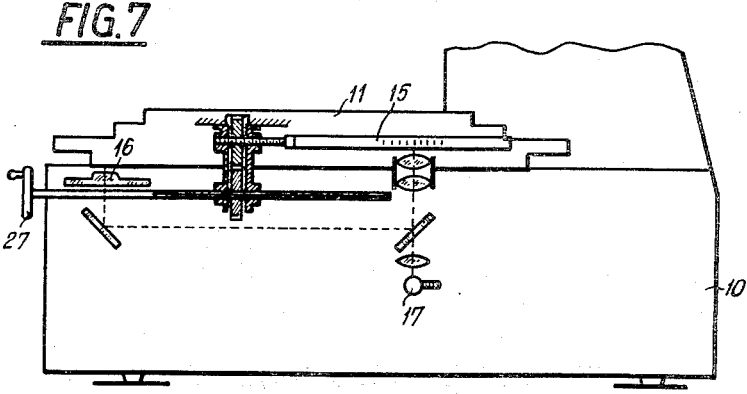

United States Patent Office 3,036,493
Patented May 29, 1962

3,036,493
OPTICAL POSITIONING SYSTEM
Andre Mottu, Heinrich Gassmann, and Christian Koechlin, Geneva, Switzerland, assignors to Societe Genevoise d'Instruments de Physique, Geneva, Switzerland, a firm of Switzerland
Filed Jan. 27, 1959, Ser. No. 789,277
Claims priority, application Switzerland Feb. 14, 1958
4 Claims. (Cl. 88—14)

The present invention has for its object a machine-tool including at least one movable member, the position of which is to be defined with an accuracy of fraction of a millimeter with reference to the position of another member.

When an operator controlling a highly accurate machine-tool, for example a jig-borer, has to position a movable member, say the working table of the machine-tool in a predetermined position with reference to another member, such as the frame, he generally executes the following operations:

A shifting of the movable member approximately into the desired location.

An adjustment of a micrometric apparatus within the fraction of a millimeter desired, say within one micron.

A provision for optical registry of a reference mark with a subdivision of the rule extending for instance between two projections located to either side of the image of a line of a rule.

Whenever it is desired to repeat the same operations on a series of parts, an arrangement which allows obtaining the corresponding positions for a movable member of the machine-tool, without it being necessary to proceed each time with the three above-mentioned operations, would be of considerable advantage, since this would save a considerable time for the operator.

There exist arrangements which allow positioning automatically a movable member of a machine-tool in previously defined locations.

Some of these prior arrangements resort, for instance, to a card or strip which has been previously perforated in accordance with a predetermined code corresponding to the desired positions of stoppage.

Other arrangements include a memory or data storing means carrying at least one magnetic impression, for instance, corresponding to the stoppage position which it is desired to obtain subsequently, in a repeated manner.

Further arrangements also exist which allow obtaining, through the registering of two reference marks, the accurate positioning of a movable member of a machine-tool at a predetermined position. The known arrangements of this type do not unfortunately show the desired accuracy.

All these prior arrangements are generally rather intricate and comparatively expensive. They must, as a matter of fact, operate with a high accuracy throughout the length of the stroke of the movable member. It is furthermore of advantage to provide means whereby an operator may be capable of checking through a direct sighting the accuracy of the operation of the automatic positioning means. By reason of these requirements, the cost of these arrangements can be justified only for machines of a sufficiently high value.

Now, of the three operations referred to hereinabove, two are comparatively easy and speedy, namely:

The shifting of the movable member with a view to bringing it approximately into the desired position does not meet with any difficulty;

The registering of the reference mark with a subdivision of the rule requires only that sufficient care be exercised.

In contradistinction, the most tedious and exacting work required from the operator consists in adjusting the micrometric apparatus, which requires the reading of a drum or of a limb in front of a vernier.

A substantial saving in time, forming the major portion of the saving of time which may be expected with an automatic position-repeating device, may be obtained through means to improve such an adjustment.

The machine-tool forming the object of the present invention includes an arrangement of the type repeating this adjustment, instead of the operator once the operator has executed a first adjustment.

According to the invention, the machine-tool includes, on the one hand, an arrangement for micrometric adjustment of the position of the movable member through a shifting of a reference mark into optical registry with a subdivision or line of a highly accurate scale-carrying rule upon preliminary shifting of said reference mark of the rule or of an image of either of them, by means of a micrometric apparatus, by an interval or spacing corresponding to the desired fraction of a millimeter and, on the other hand, a further arrangement including a series of adjustable stops which allow, during the machining of a number of similar parts, an automatic execution of the desired successive micrometric spacings or intervals with a view to eliminating the necessity of repeated measurements of such spacings.

The accompanying drawings illustrate by way of example, a preferred embodiment of the object of the invention, as applied to a jig-borer, together with two modifications of the adjusting means. In said drawings:

FIG. 5 is a diagrammatic view of a fine adjusting means according to the invention;

FIGS. 6 and 7 are diagrammatic views of two modifications of the fine adjusting means in FIG. 5.

Figure 1:
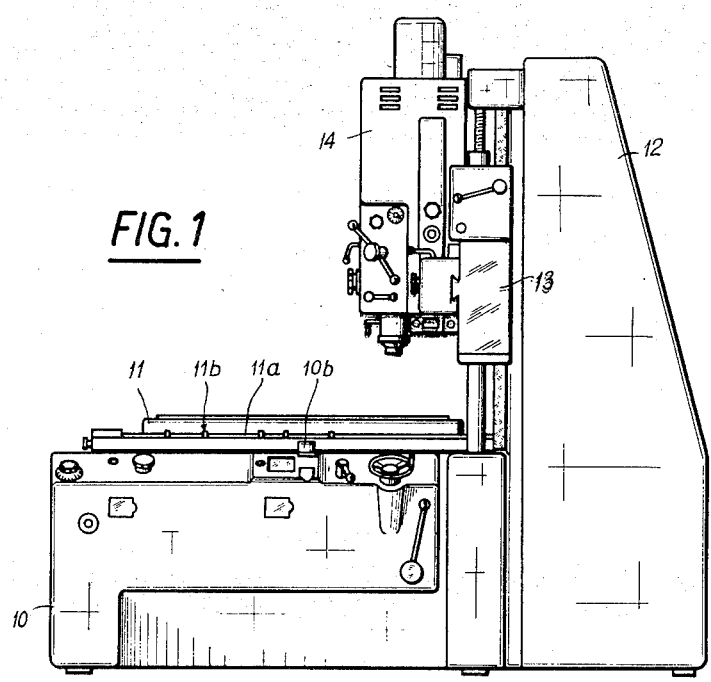
FIGS. 1 and 2 are, respectively, a side elevational view and a plan view of a machine tool provided with mechanism according to the invention.

The jig-borer illustrated includes a frame 10, a work-carrying table 11 adapted to slide over the slideways 10a provided on the frame, and two uprights or standard 12. A cross-member 13 is adapted to be shifted vertically over ways on the standard and a spindle-carrying headstock 14 is adapted to move horizontally along ways or guides on the cross-member 13.

Figure 3:
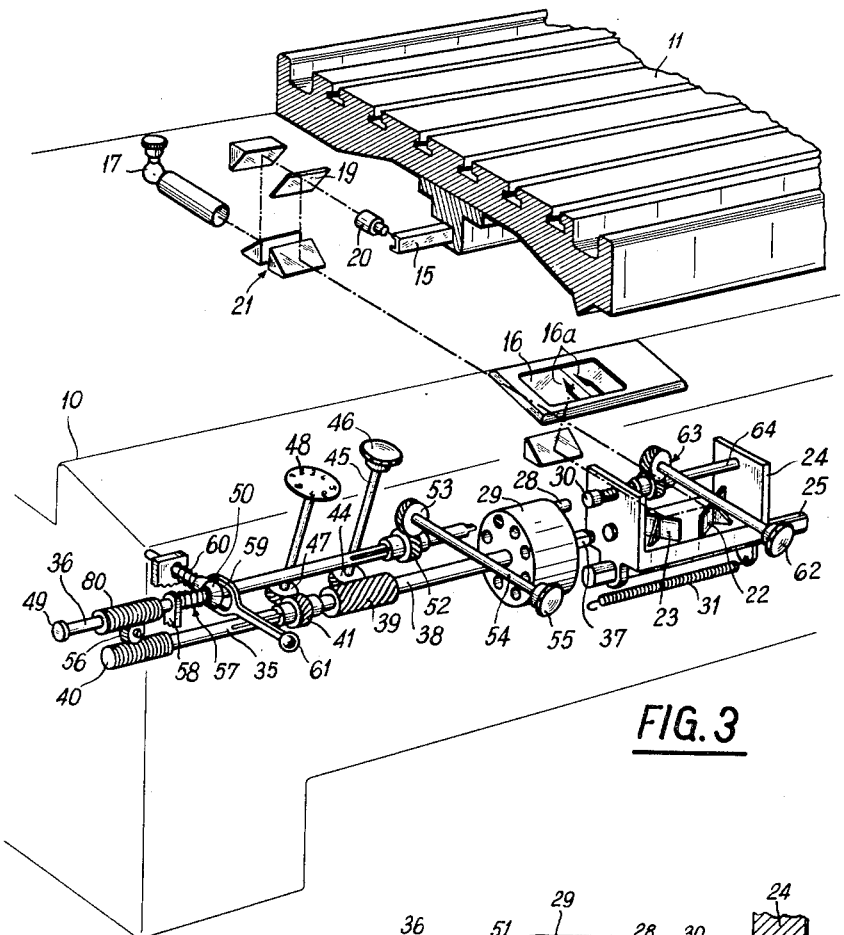
FIG. 3 is a perspective view illustrating a portion of the fine adjusting means according to the invention, on the machine tool of FIGS. 1 and 2, and of the repeating means.

The positions which the table 11 occupies during a machining operation are adjusted through the highly accurate arrangement illustrated diagrammatically in FIG. 3. This arrangement includes (FIGS. 3 and 5) a scale-carrying rule 15 fitted underneath the table 11 and an optical system for projecting an image of said rule onto a screen 16 secured to the frame 10. Across and above the screen, there extend two measuring projections or noses 16a. The optical system referred to includes a source of light 17, a semi-transparent and semi-reflecting glass sheet 19. An objective 20 provides convergence of a beam of light from the the light source onto a portion of the rule 15. The light is reflected back by the rule and a set of mirrors 21, 22, 23 directs the beam of light reflected back by the rule 15 and the glass sheet 19 onto the screen 16, so as to form on the screen an image of a line of the rule 15.

The mirrors 22 and 23 are mounted on a carriage 24 which may be shifted in parallelism with the rule 15 over a way 25, through a control mechanism including (FIG. 5) a rotatable micrometer screw 26, a dividing handwheel 27 for driving the screw in opposite directions and a clutch 18 through which it is possible to declutch the carriage 24 from the means controlling it, i.e. to release said carriage. In order to simplify the disclosure as to the operation of adjusting and repeating means as hereafter explained, FIG. 5 does not show the repeating means and FIG. 3 does not show the mechanism, the screw 26 and handwheel 27, controlling the movements of the carriage 24.

In order to position the table 11 in a predetermined position defined for instance by a measurement equal to 173.585 mm. the operations are proceeded with through the adjusting means illustrated in FIG. 5 in the following manner:

The table 11 is first brought approximately into the desired position through an auxiliary scale-carrying rule 11a over which may slide reference marks 11b. This is accomplished by positioning the line or subdivision 173, not shown, of the rule in registry with a reference mark 10b rigid with the frame. This operation sets the millimetric line 173 of the highly accurate rule 15 into registry with the optical axis of the objective 20 within the accuracy of such a rough first adjustment.

The above having been done, the carriage 24 is shifted by a distance equal to 0.585 mm. by micrometer means including the micrometer screw 26 and the subdividing handwheel 27.

Lastly the table 11 is shifted a second time, until the line 173 of the rule 15 is exactly in registry with the interval or space between the noses 16a.

When these three operations have been accomplished, the position of the table is accurately adjusted.

Each positioning of the table requires therefore an adjustment obtained in three different stages. In order to simplify and to speed up the work in the case of a production run of a number of similar parts, the machine includes a repeating device which eliminates the necessity for the operator of repeating each positioning of table 11.

This arrangement allows, as a matter of fact, adjusting automatically the millimetric fraction which is equal to 585 microns in the example given hereinabove. Moreover, the arrangement allows defining automatically the micrometric spacings for a series of successive adjustments.

To this end, the repeating means include a series of adjustable stops 28 screwed into corresponding tapped holes formed angularly spaced in a drum 29 and against which the carriage 24 is adapted to abut by means of a counter stop 30 carried by it. A spring 31 constantly urges the carriage 24 towards the drum. The carriage is thus held accurately in the positions required for successive machining operations as defined by the stops 28. The stops can be thought of as being positionable individually along a line parallel with the rectilinear path traveled by the movable member or table. The counter stop has a stop face extending across or transversely of this line along which the stops are disposed and abuts these stops in an axially adjusted position thereof as further described hereinafter.

Figure 4:
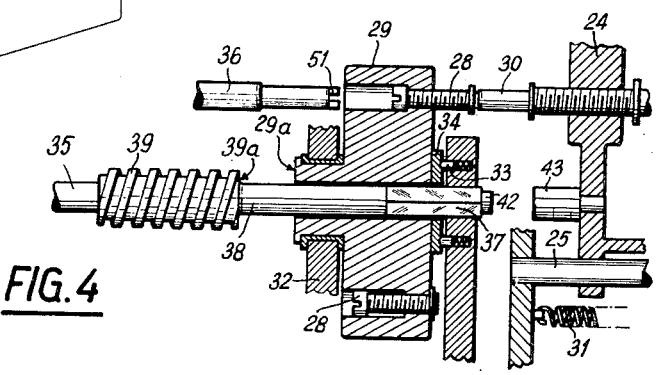
FIG. 4 is a fragmentary sectional detail view of the repeating means in FIG. 3.

The drum 29 is pivotally supported on a stationary bearing 32 formed on the frame 10 (FIG. 4). The drum's angular settings defining the longitudinal alignment of a selected stop 28 with the counter stop 30 is obtained accurately by spring biased pin 33 cooperating with suitably distributed notches in a disc 34 rigid with the drum 29. These pins are actuated longitudinally and are housed in a section of the frame.

The mechanism for adjusting the axial location of the stops 28 and for setting the drum 29 into its successive angular positions comprises a shaft 35 and a rod 36, both carried by the frame 10 in parallelism with the rule 15 and adapted to slide axially with reference to said frame.

The shaft 35 is provided, starting from the right-hand side of FIG. 3, with a section 37 having a square or polygonal outline for engagement with the disc 34, a section 38 having a cylindrical form, a section 39 having a helical gear portion and, lastly, at its left-hand end, a section having circular gear 40. The shaft 35 carries a gear ring 41 rotatable with the shaft between the gear portions 39 and 40 and held fast longitudinally with reference to the frame when the shaft is being axially shifted. The square section 37 terminates with a short stud 42 adapted to cooperate with a stop 43 on the carriage, in a manner to be described hereinafter.

The helical gear 39 meshes with a wormwheel 44 connected to a control rod 45 having a knob 46. The ring gear 41 cooperates with a pinion 47 coaxially rigid with an indicator disc 48 on which are engraved digits, for example eight digits, corresponding to eight possible angular positions of the drum 29.

The rod 36 is provided, starting from the left-hand side of FIG. 3, with a stop 49 and a collar 50 and its right-hand end is a screw driver 51. Between the stop 49 and a bearing 58 provided for the rod 36 between said stop and the collar 50 is freely fitted a sleeve 80 provided with teeth while, between the screw driver end 51 and the collar 50, the rod 36 carries an externally threaded sleeve 52 through which the rod slides freely axially while it is rotational jointly therewith. The sleeve 52 meshes with a pinion 53 fitted over the end of a rod 54, the other end of which carries a control knob 55.

The gears 40 and 80 are kinematically interconnected by a gear wheel 56.

The mechanism described includes a spring 57 wound around the rod 36 between the collar 50 and the bearing 58 and adapted to urge the rod 36 towards the right-hand side of FIG. 3. A bolt 59 subjected to the action of a spring 60 locks the rod 36 axially in the position in which it is shown in FIG. 3 when the bolt is allowed to be urged towards the rod by said spring 60. The bolt is rigid with a lever member 61 through which it is possible to shift the bolt manually and to release it against the action of the spring 60.

The adjustment of the stops 28 is performed during the machining of the first part or workpiece of a series of parts to be machined. The adjustment is performed by axially shifting the stops in succession with reference to the drum 29 after each fine adjustment of a position to be set for the table 11. The adjustment of the successive stops is executed through the screw-driver 51 which is first released by actuation of the lever 61, so that the screw-driver may engage a corresponding recess in a stop 28, after which the screw-driver is rotated by operation of the knob 55 acting on the rod 36. The axial position of each stop 28 is adjusted in a manner such that the carriage 24, separated from its micrometric means and subjected to the action of the spring 31, stops accurately in the desired position when impinging against one of the stops 28.

Figure 2:
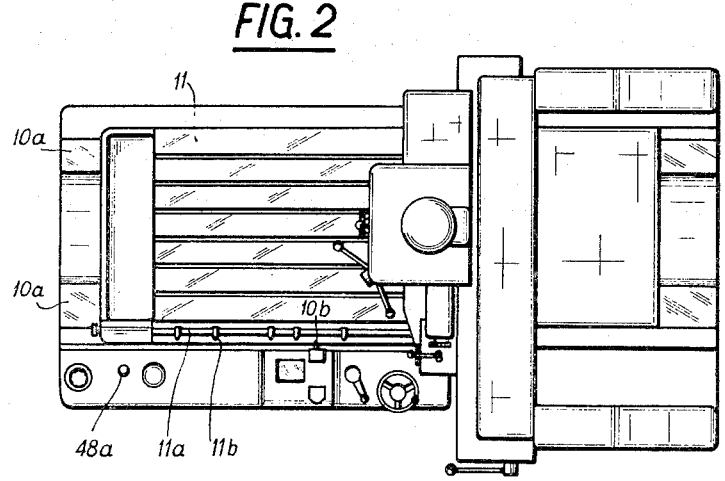

In order to bring the different stops 28 to be adjusted successively into axial registry with the screw-driver 51, the knob 46 is rotated so that it may act in two stages in the following manner:

The rotation of the knob 46 does not at first provide any turning of the shaft 35, but as a consequence of the pressure exerted by the pins 33 and of the shape given to the interengaging gears 39 and 44, it shifts the shaft 35 axially from the left-hand side towards the right-hand side until the end face 39a (FIG. 4) of the gear 39 abuts against the face surface 29a of the drum 29. During this first stage, the stud 42 engages the stop 43 and the carriage 24 is urged towards the right-hand side of FIGS. 3 and 4 against the pressure of the spring 31;

At the moment at which the surfaces 29a and 39a come into contact with each other, the shaft 35 is rotatably driven by the rotation of the rod 45 rigid with the knob 46 and the drum 29 revolves with the shaft 35. As soon as another stop 28 registers with the screw-driver 51, on the one hand, the two pins 33 snap into the following cooperating notches of the disc 34, while, on the other hand, another digit carried by the indicator disc 48 appears through a gate 48a, FIG. 2, in the same frame; at this moment, the operator releases the knob 46. The drum 29 stops and the spring 31 returns the carriage 24 towards the left-hand side of FIGS. 3 and 4 until the stop 30 engages the stop 28 which has been thus set in position and which holds the stop 30 against further movement.

The shifting towards the right-hand side of the shaft 35 during the first stage of this movement of the shaft is accompanied by a shifting towards the left by the sleeve 80, as a consequence of the kinematic connection of the elements 40—56—80. If, during this first stage, the screw-driver 51 moves out of the drum 29, the movement of the sleeve 80 has no action on the axial position of the screw-driver. However, if, on the other hand, the screw-driver 51 is then inserted in the cooperating recess in the stop 28, the sleeve 80 engages at the beginning of its leftward movement, the stop 49 on the rod 36 and, consequently, it urges the screw-driver towards the left-hand side, whereby it is constrained to pass out of the recess inside which it was held. The position of the stop 49 is obviously selected in a manner such that the screw-driver 51 may be shifted out of the drum 29 before the beginning of the second stage of the movement of the shaft 35, i.e. before its actual rotary movement.

When all the stops 28 have been adjusted, the repeating means provide or the machining of all the following parts to be machined, in the manner disclosed for the actual adjustment of the stops, this being obtained by controlling the rotation of the drum 29 through the knob 46 while checking through the indicator disc 48 the successive angular positions of the drum to be occupied by the latter for the successive machining steps.

Generally speaking, each positioning of the table 11 requires the following operations:

Positioning the table in a location corresponding roughly to the desired position;

Positioning the first stop 28 through the rotation of the knob 46, this operation replaces the tedious adjustment by a fraction of a millimeter or the like, as executed hitherto;

Shifting the table until registration is obtained between the space between the noses 16a and the image of a selected line on the rule 15.

It is also possible to adjust axially the position of the stop 30 with reference to the carriage 24 through another knob 62 (FIG. 3). This knob is connected through gearing 63 with a rod 64 carrying the stop 30. Thus, it is not necessary to secure the parts to be machined in an accurate position on the table 11 and it is sufficient to position them roughly. The spacing otherwise occurring between the actual position occupied by a part to be machined on the table 11 and the accurate position to be occupied thereby is eliminated with the arrangement which has just been described, by the axial shifting of the stop 30 before the first movement imparted to the table.

Obviously, the above-described repeating means need not be associated necessarily with the particular fine adjustment means illustrated diagrammatically in the accompanying FIG. 5. In particular, it may be associated with one of the modifications illustrated in FIGS. 6 and 7.

In the modification illustrated in FIG. 6, the highly accurate rule 15 is stationary with reference to the table 11 as in the case illustrated in FIG. 5, but the image of said rule is shifted for obtaining the fine adjustment through a shifting of a casing 64 containing the source of light 17, the glass sheet 19 and the objective 20.

In the second modification, the fine adjustment of the position of the table 11 is obtained through a shifting of the rule 15 which is slidingly carried underneath the table 11 while all the components of the optical system are stationary with reference to the frame 10.

What we claim is:

1. In a machine tool having a stationary frame and a member movable relative to said frame in opposite directions along a rectilinear path, a highly accurate positioning system for said movable member comprising, a scale rigid with the movable member for traveling therewith parallel with said path of rectilinear movement, a stationary screen secured to the machine tool having a reference mark, an optical reflecting system on said machine tool comprising means to form an image of a point of said scale on said screen, a carriage on said machine tool having a part of said reflecting system thereon and selectively movable relative to said machine tool in a direction parallel with said path to cause relative movement between said scale and said reflecting system along a line parallel with said rectilinear path and thereby shift said image of a point of the scale on the screen towards a position in registry with said reference mark, a plurality of threaded stops extending in a direction parallel with said rectilinear path, a common support carrying the threaded stops mounted for angular displacement in a transverse plane perpendicular to said path to set the stops selectively, alternatively, individually in alignment with a predetermined line parallel with said path, a screwdriver mounted on said machine tool movable along said predetermined line, means for moving said screw-driver axially into operative engagement with the individual stops selectively positioned in alignment with said line, means for selectively rotatably driving the screwdriver to make the individual stop engaged by it project beyond said transverse plane by an amount corresponding to a desired position to be set for the movable member beyond a predetermined reference position, a counter-stop rigid with said carriage extending across said predetermined line to abut against the individual stop registering with said line and axially adjusted by said screwdriver in a position assumed by said carriage which said image of a point of the scale registers with said reference mark.

2. In a machine tool having a stationary frame and a member movable relative to said frame in opposite directions along a rectilinear path, a highly accurate positioning system for said movable member comprising, a scale rigid with the movable member for traveling therewith parallel with said path of rectilinear movement, a stationary screen secured to the machine tool having a reference mark, an optical reflecting system mounted on said machine tool comprising means to form an image of a point of said scale on said screen, a carriage on said machine tool having a part of said reflecting system thereon selectively movable in a direction parallel with said path to cause relative movement between said scale and said reflecting system along a line parallel with said rectilinear path to thereby shift said image of a point of the scale on the screen towards a position in registry with said refernce mark, a plurality of threaded stops extending in a direction parallel with said rectilinear path, a common support mounted on said machine tool carrying said threaded stops and mounted on said machine tool for angular displacement in a transverse plane perpendicular to said path to set the stops selectively alternatively, individually in alignment with a predetermined line parallel with said path, a screwdriver mounted on said machine tool movable along said predetermined line, elastic means urging said screwdriver axially into operative engagement with the individual stops selectively positioned in alignment with said line, means for positively and rotatably driving the screwdriver to make the individual stop engaged by it project beyond said transverse plane by an amount corresponding to a desired stopping position to be established for the movable member beyond a predetermined refernce position, a counter stop rigid with the carriage extending across said predetermined line to abut against the individual stop registering with said line and axially adjusted by said screwdriver in a position assumed by said carriage in which said image of a point of the scale registers with said reference mark.

3. In a machine tool having a stationary frame and a member movable relative to said frame in opposite directions along a rectilinear path, a highly accurate positioning system for said movable member comprising, a scale rigid with said movable member for traveling therewith parallel with said path of rectilinear movement, a stationary screen secured to said machine tool having a reference mark, an optical reflecting system mounted on said machine tool comprising means to form an image of a point of said scale on said screen, a carriage on said machine tool having a part of said reflecting system thereon and selectively movable in a direction parallel with said path to cause relative movement between said scale and said reflecting system along a line parallel with said rectilinear path to thereby shift said image of a point of the scale on the screen towards a position in registry with said reference mark, a drum revolvably mounted on said machine tool for rotation around an axis parallel with said path, a plurality of threaded stops carried by said drum extending in operation in parallelism with said rectilinear path, said threaded stops being arranged angularly spaced on said drum for being positioned individually, alternatively on a predetermined line parallel with said rectilinear path upon rotation of said drum, said stops being mounted for extending axially from a common face of said drum disposed in a transverse plane perpendicular to said line, a selectively driven rotary control shaft movable axially disposed coaxial with the drum for carrying said drum and rotating it, said shaft extending beyond said drum to engage and stop the carriage in an inoperative position, means comprising a control member to shift said shaft axially towards the carriage and then rotatably drive the shaft to set said stops selectively in alignment with said predetermined line parallel with said path, a rotatable screw driver mounted on said machine tool movable along said predetermined line, means for moving said screw driver axially into operative engagement with the individual stops selectively positioned in alignment with said line, means for rotatably driving said screw driver to make the individual stop engaged by it project beyond said transverse plane by an amount corresponding to a desired position to be established for said movable member beyond a predetermined reference position, a counter stop rigid with the carriage extending across said predetermined line to abut against the individual stop registering with said line and axially adjusted by said screw driver in a position assumed by said carriage in which said image of a point of the scale registers with said reference mark.

4. In a machine tool having a stationary frame and a member movable relative to said frame in opposite directions along a rectilinear path, a highly accurate positioning system for said movable member comprising, a scale rigid with said movable member for traveling therewith parallel with said path of rectilinear movement, a stationary screen secured to said machine tool having a reference mark on said screen, an optical reflecting system mounted on said machine tool having means to form an image of a point of said scale on said screen, a carriage on said machine tool having a part of said reflecting system thereon and selectively movable in a direction parallel with said path to cause relative movement between said scale and said reflecting system along a line parallel with said rectilinear path to thereby shift said image of a point of the scale on the screen towards a position in registry with said reference mark, a drum revolvably mounted on said machine tool for rotation around an axis parallel with said path, a plurality of threaded stops carried by said drum extending in operation in parallelism with said rectilinear path, said threaded stops being arranged angularly spaced on said drum for being positioned individually, alternatively on a predetermined line parallel with said rectilinear path upon rotation of said drum, said stops being mounted for extending axially from a common face of said drum disposed in a transverse plane perpendicular to said line, a selectively driven rotary shaft movable axially disposed coaxial with the drum for carrying said drum and rotating it, said shaft extending beyond said drum to engage and stop the carriage in an inoperative position, means comprising a control member to shift said shaft axially towards the carriage and then rotatably drive said shaft to set said stops selectively in alignment with said predetermined line parallel with said path, a rotatable screw driver mounted on said machine tool movable along said predetermined line, means for moving said screw driver axially into operative engagement with the individual stops selectively positioned in alignment with said line, means for positively and rotatably driving said screw driver to make the individual stop engaged by it project beyond said transverse plane by an amount corresponding to a desired position to be established for said movable member beyond a predetermined reference position, a counter stop rigid with the carriage extending across said predetermined line to abut against the individual stop registering with said line and axially adjusted by said screw driver in a position assumed by said carriage in which said image of a point of the scale registers with said reference mark, means kinematically interconnecting said screw driver with said shaft to make said shaft and screw driver move longitudinally in opposite directions, and means for allowing rotation of said shaft upon axial displacement thereof in a direction towards the carriage to a predetermined position.

References Cited in the file of this patent

UNITED STATES PATENTS

| | | |
|---|---|---|
| 2,311,142 | Turrettini | Feb. 16, 1943 |
| 2,812,671 | Mottu | Nov. 12, 1957 |
| 2,933,013 | Baker | Apr. 19, 1960 |

FOREIGN PATENTS

| | | |
|---|---|---|
| 988,270 | France | Apr. 25, 1951 |
| 859,958 | Germany | Dec. 18, 1952 |